US008476800B2

(12) United States Patent
Lai et al.

(10) Patent No.: US 8,476,800 B2
(45) Date of Patent: Jul. 2, 2013

(54) THREE-PHASE MOTOR WITH OVERLAPPING COILS AND FAN

(75) Inventors: Chin-Chun Lai, Taoyuan Hsien (TW); Kun-Fu Chuang, Taoyuan Hsien (TW); Shin-Ming Huang, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 468 days.

(21) Appl. No.: 12/731,453

(22) Filed: Mar. 25, 2010

(65) Prior Publication Data

US 2011/0110800 A1  May 12, 2011

(30) Foreign Application Priority Data

Nov. 9, 2009  (CN) .......................... 2009 1 0221070

(51) Int. Cl.
F04D 25/08  (2006.01)
(52) U.S. Cl.
USPC .......................................... 310/179; 310/198
(58) Field of Classification Search
USPC ................... 310/67 R, 179, 158, 210, 49.06, 310/49.19, 49.21, 49.22, 156.25, 156.34, 310/156.35, 156.37, 156.38, 156.45, 156.46, 310/156.62, 156.64, 198, 268, DIG. 6
See application file for complete search history.

(56) References Cited

U.S. PATENT DOCUMENTS

| 3,402,333 | A | * | 9/1968 | Hayner et al. | 318/400.01 |
| 4,109,170 | A | * | 8/1978 | Fujita et al. | 310/68 R |
| 4,167,692 | A | * | 9/1979 | Sekiya et al. | 318/400.41 |
| 5,510,663 | A | * | 4/1996 | Van Loenen | 310/179 |
| 5,608,278 | A | * | 3/1997 | Mey et al. | 310/90 |
| 5,675,206 | A | * | 10/1997 | Horski | 310/268 |
| 6,873,069 | B1 | * | 3/2005 | Odagiri et al. | 310/64 |
| 7,291,956 | B2 | * | 11/2007 | Itoh et al. | 310/208 |
| 7,456,541 | B2 | * | 11/2008 | Horng et al. | 310/268 |
| 7,804,220 | B2 | * | 9/2010 | Osada et al. | 310/268 |
| 2006/0049703 | A1 | * | 3/2006 | Hosono et al. | 310/68 B |
| 2006/0087198 | A1 | * | 4/2006 | Kang et al. | 310/268 |
| 2007/0046127 | A1 | * | 3/2007 | Kloeppel et al. | 310/180 |
| 2007/0200445 | A1 | * | 8/2007 | Yamagiwa | 310/156.32 |

* cited by examiner

Primary Examiner — Hanh Nguyen
Assistant Examiner — Naishadh Desai
(74) Attorney, Agent, or Firm — Muncy, Geissler, Olds & Lowe, PLLC

(57) ABSTRACT

A three-phase motor includes a bearing structure, a rotor structure and a stator structure. The bearing structure has a bushing. The rotor structure has a shaft disposed in the bushing. The stator structure is disposed corresponding to the rotor structure and includes a first coil assembly and a second coil assembly overlapped on the first coil assembly. A fan with the motor is also disclosed. The present invention can increase the ratio of the effective coils of the stator structure, and further promote the operation efficiency of the three-phase motor and the fan with the three-phase motor.

17 Claims, 7 Drawing Sheets

THREE-PHASE MOTOR WITH OVERLAPPING COILS AND FAN

CROSS REFERENCE TO RELATED APPLICATIONS

This Non-provisional application claims priority under 35 U.S.C. §119(a) on Patent Application No(s). 200910221070.9 filed in People's Republic of China on Nov. 9, 2009, the entire contents of which are hereby incorporated by reference.

BACKGROUND OF THE INVENTION

1. Field of Invention

The present invention relates to a fan and a motor thereof and, in particular, to a fan and a three-phase coreless motor thereof.

2. Related Art

Motors are devices to transform electrical energy into mechanical energy, and have been applied to many products such as fans, optical disc drives, hard disk drives, optical devices or vehicle devices in daily lives. Though the motors can be classified into various types, the fundamental operation principle of the motors is electromagnetic effect.

As shown in FIG. 1A, a conventional three-phase coreless motor 1 includes a bearing structure 11 and a rotor structure 12. The rotor structure 12 includes a shaft 121, a magnetic housing 122 and a magnetic ring 123. The shaft 121 is disposed in the bearing structure 11. The magnetic housing 122 is connected to the shaft 121. The magnetic ring 123 is disposed around and connected to the inner surface of the magnetic housing 122. In addition, the motor 1 further includes a stator structure 13, which includes a three-phase coreless coil assembly 131 disposed around the shaft 121 corresponding to the magnetic ring 123 perpendicularly. When applying current to the three-phase coreless coil assembly 131, it generates electromagnetic effect with the magnetic ring 123 to drive the shaft 121, the magnetic housing 122 and the magnetic ring 123 to rotate.

FIG. 1B is a three-dimensional figure of the three-phase coreless coil assembly 131. As shown in FIG. 1B, the three-phase coreless coil assembly 131 includes, for example, 6 groups of coils, and the coils with same phase such as the coils 131a-1 and 131a-2, the coils 131b-1 and 131b-2, and the coils 131c-1 and 131c-2 are disposed corresponding to each other, respectively. To promote the operation efficiency of the motor 1, the ratio of the coils generating effective electromagnetic effect with the magnetic ring 123 of the rotor structure 12 in the three-phase coreless coil assembly 131 has to be increased. It means that the slot-fill factor in the same space shown in FIG. 1B has to be increased. In other words, the ratio of the effective coils of the three-phase coreless coil assembly 131 must be increased.

However, the ratio of the effective coils of the three-phase coreless coil assembly 131 is frequently restricted due to the limited space of the stator structure 13 of the motor 1. Thus, without expanding the space of the stator structure 13, it is impossible to highly increase the ratio of the effective coils of the three-phase coreless coil assembly 131. Consequentially, the operation efficiency of the motor 1 cannot be further enhanced.

Therefore, it is an important subject of the invention to provide a three-phase motor with the high ratio of the effective coils of the stator structure for promoting the operation efficiency.

SUMMARY OF THE INVENTION

In view of the foregoing, the present invention is to provide a three-phase motor with a high ratio of the effective coils in the stator structure for promoting the operation efficiency, and a fan including the three-phase motor.

To achieve the above, a three-phase motor in accordance with the present invention includes a bearing structure, a rotor structure and a stator structure. The bearing structure has a bushing. The rotor structure has a shaft disposed in the bushing. The stator structure is disposed corresponding to the rotor structure, and includes a first coil assembly and a second coil assembly overlapped on the first coil assembly.

In one embodiment of the present invention, the three-phase motor further includes a base on which the stator structure is disposed.

In one embodiment of the present invention, the rotor structure further includes a magnetic housing connected to the shaft, and the magnetic housing, the shaft and the base form a receptacle.

In one embodiment of the present invention, the rotor structure further includes a magnetic body disposed in the receptacle and connected to the magnetic housing, and the magnetic body is disposed corresponding to the stator structure.

In one embodiment of the present invention, the magnetic body is a magnetic ring.

In one embodiment of the present invention, each of the first coil assembly and the second coil assembly is a three-phase coreless coil assembly.

In one embodiment of the present invention, the first coil assembly includes a plurality of first coils and the second coil assembly includes a plurality of second coils. The first coils with the same phase in the first coil assembly are disposed opposite to each other. The second coils with the same phase in the second coil assembly are disposed opposite to each other.

In one embodiment of the present invention, one of the first coils of the first coil assembly and one of the second coils of the second coil assembly having the same phase are disposed vertically opposite to each other.

In one embodiment of the present invention, one of the first coils of the first coil assembly and one of the second coils of the second coil assembly having the same phase are disposed relative to each other with an included angle.

In one embodiment of the present invention, the ratio of the sum of circle numbers of the first coils and the second coils to the number of the magnetic poles of the magnetic body is 3:2.

In one embodiment of the present invention, the first coil assembly is overlapped on the second coil assembly through a plastic element.

In one embodiment of the present invention, each of the first coil assembly and the second coil assembly is formed by adhesion or plastic injection molding.

In one embodiment of the present invention, the first coils and the second coils are formed by a four-group winding method or a two-group winding method.

In one embodiment of the present invention, the first coils and the second coils are connected by a delta (Δ) connection or a star (Y) connection.

In one embodiment of the present invention, the three-phase motor further includes a circuit board electrically connected to the first coil assembly and the second assembly, respectively.

To achieve the above, a fan in accordance with the present invention includes a three-phase motor, an impeller structure and an upper cover. The three-phase motor includes a bearing structure, a rotor structure and a stator structure. The bearing structure includes a bushing. The rotor structure includes a shaft disposed in the bushing. The stator structure is disposed corresponding to the rotor structure and includes a first coil assembly and a second coil assembly overlapped on the first coil assembly. The impeller structure is connected to the rotor structure of the three-phase motor. The upper cover is connected to the three-phase motor and covers the impeller structure.

In one embodiment of the present invention, the three-phase motor further includes a base on which the stator structure is disposed.

In one embodiment of the present invention, the rotor structure further includes a magnetic housing connected to the shaft, and the magnetic housing, the shaft and the base form a receptacle.

In one embodiment of the present invention, the rotor structure further includes a magnetic body disposed in the receptacle and connected to the magnetic housing, and the magnetic body is disposed corresponding to the stator structure.

In one embodiment of the present invention, the magnetic body is a magnetic ring.

In one embodiment of the present invention, each of the first coil assembly and the second coil assembly is a three-phase coreless coil assembly.

In one embodiment of the present invention, the first coil assembly includes a plurality of first coils and the second coil assembly includes a plurality of second coils. The first coils with the same phase in the first coil assembly are disposed opposite to each other. The second coils with the same phase in the second coil assembly are disposed opposite to each other.

In one embodiment of the present invention, one of the first coils of the first coil assembly and one of the second coils of the second coil assembly having the same phase are disposed vertically opposite to each other.

In one embodiment of the present invention, one of the first coils of the first coil assembly and one of the second coils of the second coil assembly having the same phase are disposed relative to each other with an included angle.

In one embodiment of the present invention, the ratio of the sum of circle numbers of the first coils and the second coils to the number of the magnetic poles of the magnetic body is 3:2.

In one embodiment of the present invention, the first coil assembly is overlapped on the second coil assembly through a plastic element.

In one embodiment of the present invention, each of the first coil assembly and the second coil assembly is formed by adhesion or plastic injection molding.

In one embodiment of the present invention, the first coils and the second coils are formed by a four-group winding method or a two-group winding method.

In one embodiment of the present invention, the first coils and the second coils are connected by a delta (Δ) connection or a star (Y) connection.

In one embodiment of the present invention, the three-phase motor further includes a circuit board electrically connected to the first coil assembly and the second assembly, respectively.

As mentioned above, the three-phase motor in accordance with the present invention includes the first coil assembly and the second coil assembly overlapped on the first coil assembly in the limited space of the stator structure, and one of the first coils of the first coil assembly and one of the second coils of the second coil assembly having the same phase are disposed relative to each other with an included angle. Thus, the first coil assembly and the second coil assembly can individually have the coils able to generate effective electromagnetic effects with the magnetic body of the rotor structure. In other words, the first coil assembly and the second coil assembly of the three-phase motor in accordance with the present invention have a higher ratio of the effective coils in comparison with the conventional three-phase motor. Thus, it can promote the operation efficiency of the three-phase motor, and simultaneously promote the operation efficiency of the fan including the three-phase motor in accordance with the present invention as well.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
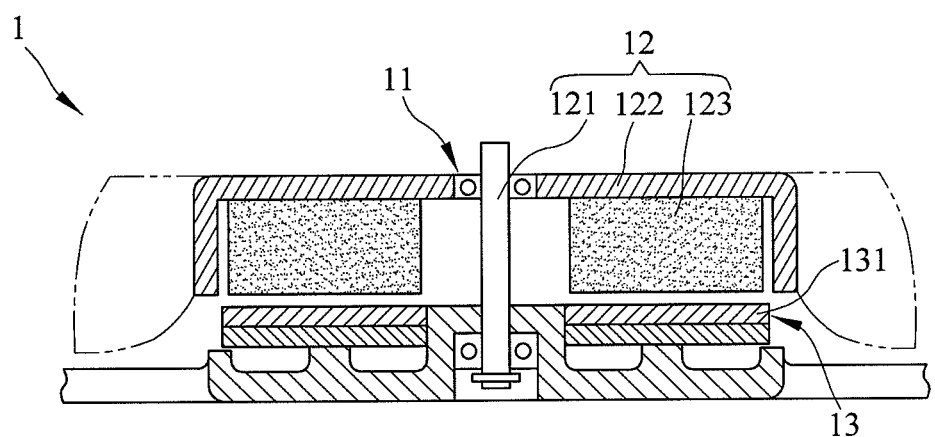
FIG. 1A is a cross-sectional figure of a conventional three-phase motor.
Figure 1B:
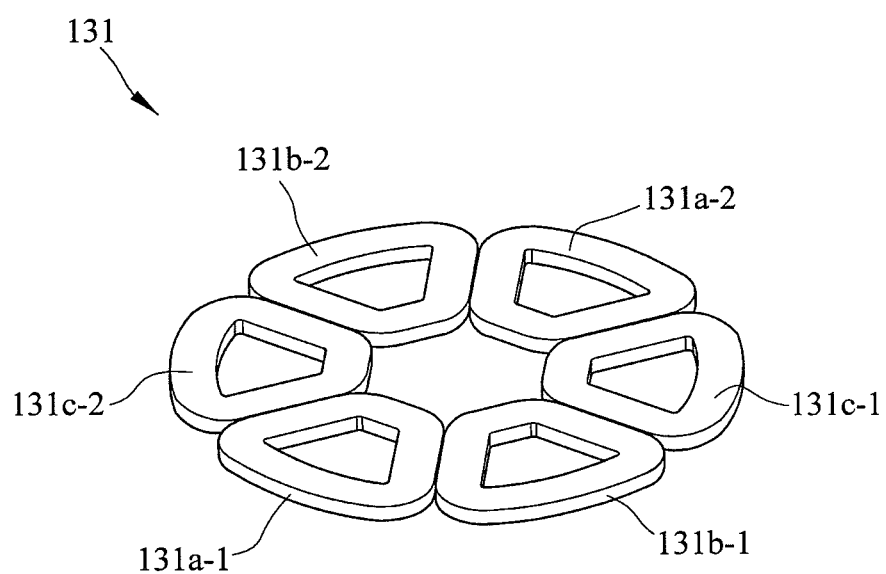
FIG. 1B is a three-dimensional figure of the coil assembly of the conventional three-phase motor.
Figure 2:
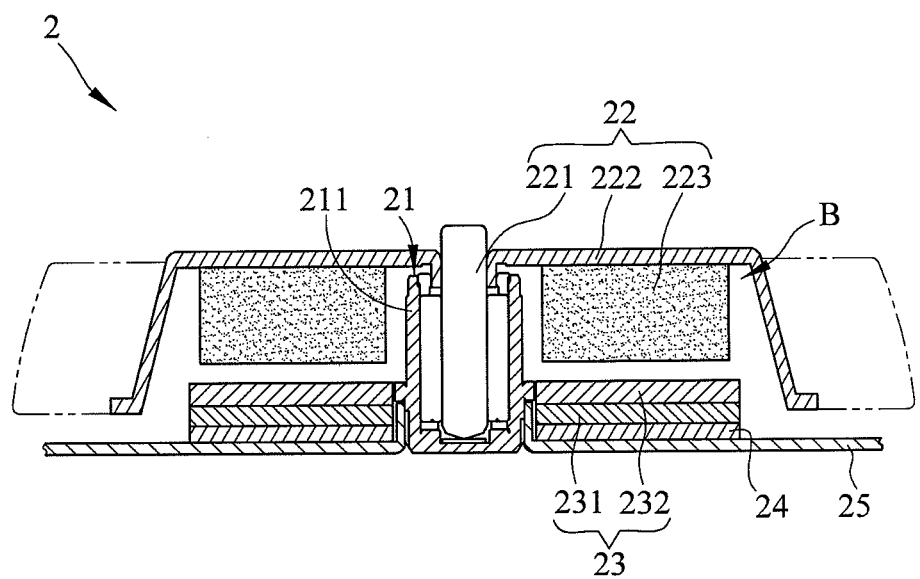
FIG. 2 is a cross-sectional figure of a three-phase motor in accordance with one preferred embodiment of the present invention.

FIG. 2 is a cross-sectional figure of a three-phase motor 2 in accordance with one preferred embodiment of the present invention. As shown in FIG. 2, the motor 2 of the present invention is a three-phase coreless motor and an exterior rotor motor as well. The motor 2 of the present invention can be applied to, for example but not limited to, fans, optical disc drives, hard disk drives, optical devices, vehicle devices or other electronic devices. Moreover, the appearance and the shape of the motor 2 of the present invention are not limited, and the structure of the motor 2 can vary corresponding to applied and fields as well.

The motor 2 includes a bearing structure 21, a rotor structure 22 and a stator structure 23.

The bearing structure 21 includes a bushing 211. The rotor structure 22 includes a shaft 221 and is disposed in the bushing 211. The rotor structure 22 can further include a magnetic housing 222 and a magnetic body 223. The magnetic housing 222 is connected to the shaft 221. Additionally, the magnetic housing 222 is connected to the shaft 221 by, for example but not limited to, engagement, mounting or adhesion.

The motor 2 can further include a base 25 on which the stator structure 23 is disposed. In the present embodiment, the base 25 is, for example, made of a material containing iron. Additionally, the magnetic housing 222, the shaft 221 and the base 25 can form a receptacle B.

The magnetic body 223 is disposed in the receptacle B and connected to the magnetic housing 222; moreover, the magnetic body 223 and the stator structure 23 are disposed vertically corresponding to each other. In more detailed, the magnetic body 223 is disposed in the receptacle B and disposed around the upper surface of the magnetic housing 222, and the magnetic body 223 is also disposed vertically opposite to the stator structure 23. The magnetic body 223 can be, for example, a magnetic ring formed by a permanent magnet.

The stator structure 23 is disposed corresponding to the magnetic body 223 of the rotor structure 22, and has a first coil assembly 231 and a second coil assembly 232 overlapped on the first coil assembly 231. In the present embodiment, each of the first coil assembly 231 and the second coil assembly 232 is a three-phase coreless coil assembly.

Figure 3A:
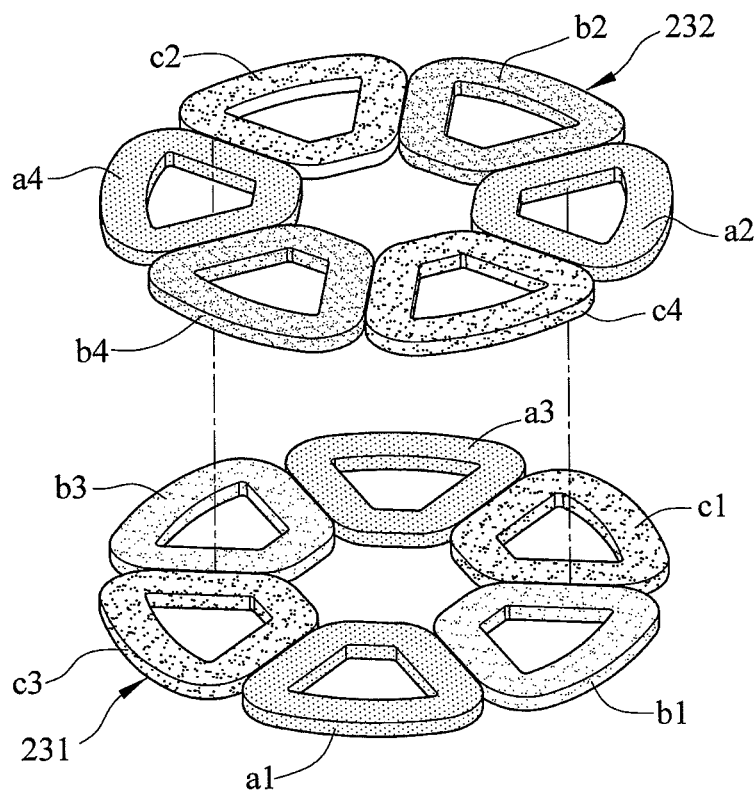
FIGS. 3A and 3B are the exploded view and assembly figure of the first coil assembly and the second coil assembly in accordance with the preferred embodiment of the present invention.
Figure 3B:
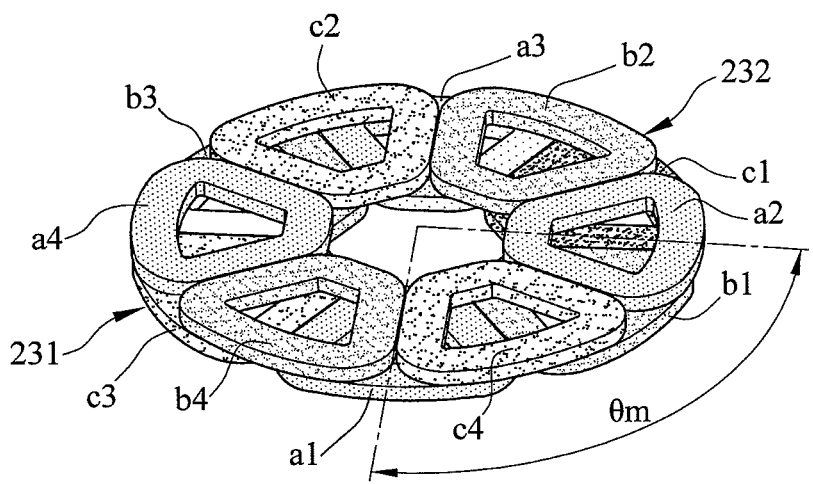

FIGS. 3A and 3B are the exploded view and assembly figure of the first coil assembly 231 and the second coil assembly 232 in accordance with the present embodiment. The first coil assembly 231 includes a plurality of first coils, and the second coil assembly includes a plurality of second coils. Additionally, the first coils with the same phase in the first coil assembly are disposed opposite to each other, and the second coils with the same phase in the second coil assembly are disposed opposite to each other. To be noted, the coil number of the first coils must be equal to that of the second coils.

In the present embodiment, the first coil assembly 231 includes, for example, six groups of the first coils a1, a3, b1, b3, c1 and c3. The first coils a1 and a3 have the same phase and disposed opposite to each other, the first coils b1 and b3 have the same phase and disposed opposite to each other, and the first coils c1 and c3 have the same phase and disposed opposite to each other. Similarly, the second coil assembly 232 also includes six groups of second coils a2, a4, b2, b4, c2, and c4. The second coils a2 and a4 have the same phase and disposed opposite to each other, the second coils b2 and b4 have the same phase and disposed opposite to each other, and the second coils c2 and c4 have the same phase and disposed opposite to each other. Additionally, the first coils a1 and a3 of the first coil assembly 231 and the second coils a2 and a4 of the second coil assembly 232 have the same phase, the first coils b1 and b3 of the first coil assembly 231 and the second coils b2 and b4 of the second coil assembly 232 have the same phase, and the first coils c1 and c3 of the first coil assembly 231 and the second coils c2 and c4 of the second coil assembly 232 have the same phase.

Moreover, one of the first coils of the first coil assembly 231 and one of the second coils of the second coil assembly 232 having the same phase are disposed vertically opposite to each other. As shown in FIG. 3B, in the present embodiment, the first coils a1 and a3 of the first coil assembly 231 and the second coils a2 and a4 of the second coil assembly 232 are disposed vertically opposite to each other, respectively.

Similarly, other first coils of different phases such as b1, b3, c1 and c3 of the first coil assembly 231 and other second coils such as b2, b4, c2 and c4 having the same phase as the corresponding first coils are disposed opposite to one another. Therefore, the detailed description thereof will be omitted.

Figure 4:
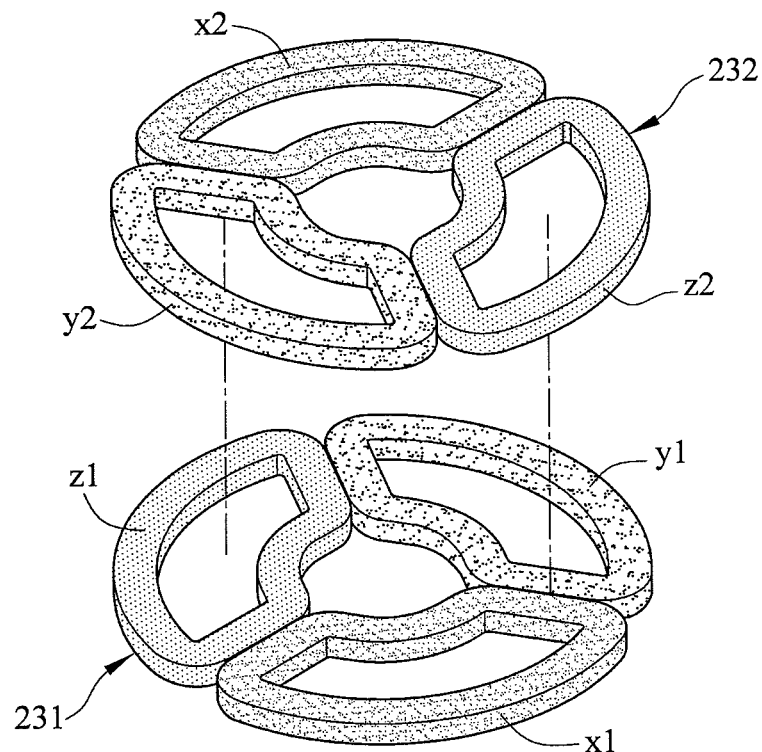
FIG. 4 is a schematic figure of another aspect of the first coil assembly and the second coil assembly in accordance with the preferred embodiment of the invention.

To be noted, as shown in FIG. 4, the first coil assembly 231 has three groups of the first coils x1, y1 and z1, and the second coil assembly 232 has three groups of the second coils x2, y2 and z2. Because the first coil assembly 231 only includes the first coils x1, y1 and z1, the phases of the first coils x1, y1 and z1 in the first coil assembly 231 are all different. Similarly, because the second coil assembly 232 only includes the second coils x2, y2 and z2, the phases of the second coils x2, y2 and z2 in the second coil assembly 232 are also different. However, the first coils x1, y1 and z1 of the first coil assembly 231 may have the same phase with the second coils x2, y2 and z2 of the second coil assembly 232. For example, the first coil x1 and the second coil x2 have the same phase and are disposed opposite to each other, the first coil y1 and the second coil y2 have the same phase and are disposed opposite to each other, and the first coil z1 and the second coil z2 have the same phase and are disposed opposite to each other.

As shown in FIG. 3B, one of the first coils of the first coil assembly 231 and one of the second coils of the second coil assembly 232 having the same phase are disposed relative to each other with an included angle $\theta m$. In the present embodiment, the first coil a1 and the second coil a2 having the same phase are disposed relative to each other with the included angle $\theta m$, and the degree of the included angle $\theta m$ is in reverse proportion to the pole pair number P of the magnetic body 223. The included angle $\theta m$ and the pole pair number P of the magnetic body 223 have to comply with the following mathematical equation:

$$\theta_m = 2 \times \theta_e / P$$

In the equation, P is the pole pair number of the magnetic body 223 (for example, an N pole and an S pole are counted as one pole pair number, and the number of poles are twice as much as the pole pair number). $\theta e$ is the electrical angle and equal to 180 degree Similarly, the other first coils with different phases such as b1, b3, c1, and c3 of the first coil assembly 231 and the second coils such as b2, b4, c2 and c4 having the same phases as the corresponding first coils are disposed relative to each other with a included angle $\theta_m$. For example, the first coil b1 and the second coil b2 are disposed relative to each other with the included angle $\theta_m$ as well. Therefore, the detailed description of the other first and second coils can be omitted.

Additionally, the ratio of the sum of the coil numbers of the first coil assembly 231 and the second coil assembly 232 of the motor 2 to the number of magnetic poles of the magnetic body 223 is for example 3:2 (when 0, is equal to 180 degree).

In the present embodiment, the sum of the coil numbers of the first coil assembly 231 and the second coil assembly 232 is 12 (the first coil assembly 231 and the second coil assembly 232 respectively have six groups of coils). In accordance with the aforementioned ratio, the pole pair number P of the magnetic body 223 can be 4 (the total number of the magnetic poles is 8 including 4 N poles and 4 S poles). Therefore, as shown in FIG. 3B, the first coil a1 of the first coil assembly 231 and the second coil a2 of the second coil assembly 232 are disposed relative to each other with the included angle $\theta_m$, and $\theta_m = 2 \times 180/4 = 90$ (degrees). Accordingly, the first coil b1 and the second coil b2 having the same phase are disposed relative to each other with the included angle $\theta_m$, and $\theta_m$ is equal to 90 degree as well. The detailed descriptions of the other coils will be omitted.

Figure 5:
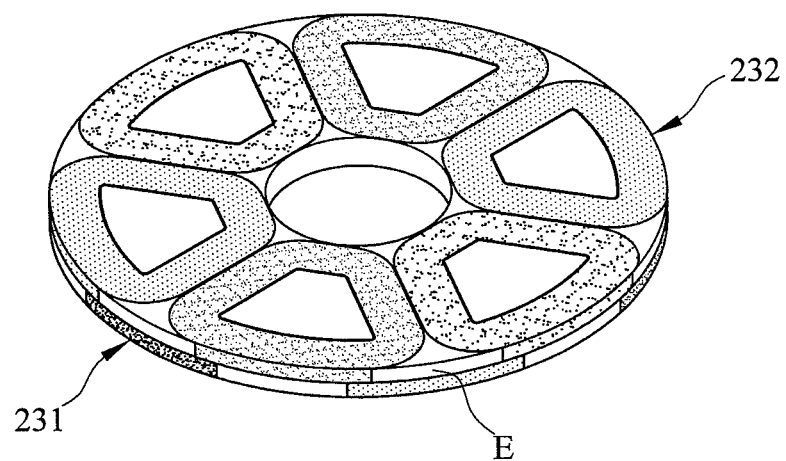
FIG. 5 is a schematic figure of other aspect of the first coil assembly and the second coil assembly in accordance with the preferred embodiment of the invention.

Additionally, as shown in FIG. 3B, the well-wound second coil assembly 232 is overlapped on the first coil assembly 231 by adhesion. Alternatively, the second coil assembly 232 can also be overlapped on the first coil assembly 231 by different configurations. For example, the first coil assembly 231 and the second assembly 232 can be disposed in a mold first, and then processed with a plastic element E by injection molding. As shown in FIG. 5, after they cool down, the first coil assembly 231 and the second coil assembly 232 are combined together with the plastic element E as one piece.

Figure 6A:
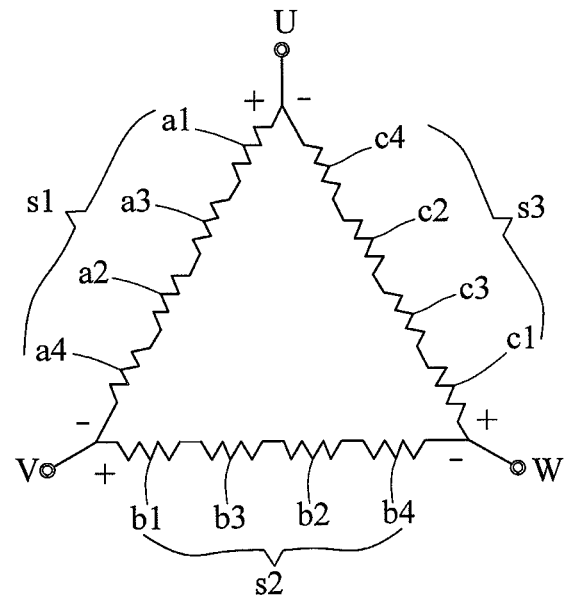
FIGS. 6A to 6D are schematic figures of the different winding methods and connections of the first coil assembly and the second coil assembly of the preferred embodiment of the present invention.
Figure 6B:
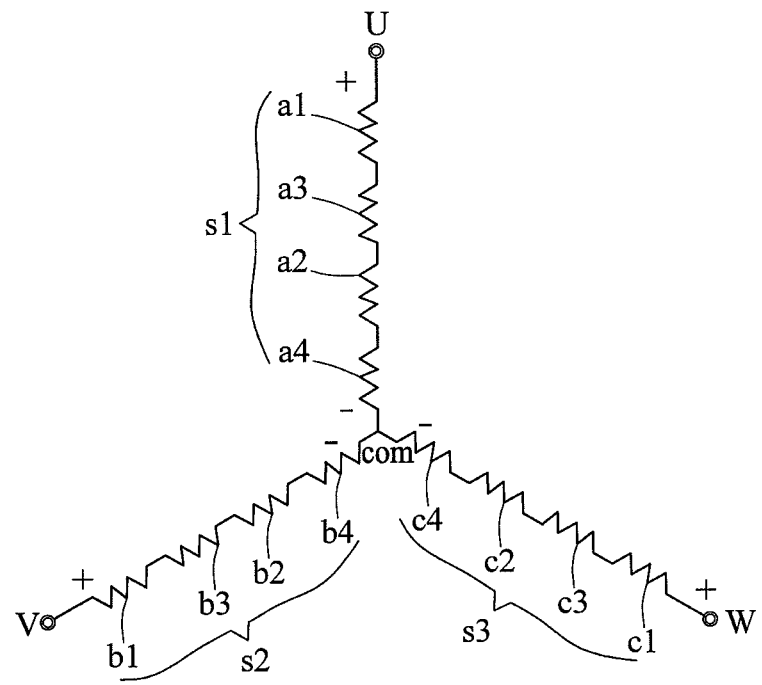

The first coil assembly 231 and the second coil assembly 232 are formed by, for example, a four-group winding method or a two-group winding method, and the first coil assembly 231 and the second coil assembly 232 are connected as a delta (Δ) connection or a star (Y) connection. As shown in FIG. 6A, in the present embodiment, the four groups of coils including the first coils a1 and a3 and the second coils a2 and a4 have the same phase and thereby are wound in series to form a four-group winding coil s1. Similarly, the four groups of the coils including the first coils b1 and b3 and the second coils b2 and b4 are wound in series to form a four-group winding coil s2, and the four groups of the coils including the first coils c1 and c3 and the second coils c2 and c4 are wound in series to form a four-group winding coil s3. Then, three four-group winding coils s1, s2 and s3 are connected by a delta (Δ) connection, and further electrically connected to power sources with difference phases including U, V and W phases. Alternatively, as shown in FIG. 6B, the three four-group winding coil s1, s2 and s3 can also be connected by a star connection (Y), and further electrically connected to the power sources with different phases including U, V and W phases.

To be noted, the winding order of any of the four-group winding coils s1, s2 and s3 is variable. Take the four-group winding coil s1 for example. The winding order of the coils a1 to a4 can be variable instead of being from the first coil a1, the first coil a3, the second coil a2 to the second coil a4 in order. In contrast, the winding order of the coils a1 to a4 can also be, for example but not limited to, from the first coil a1, the second coil a2, the first coil a3 to the second coil a4, or, otherwise, other different winding orders. The other four-group winding coils s2 and s3 are in the same situation, and, their winding orders can be not limited to the aforementioned case.

Figure 6C:
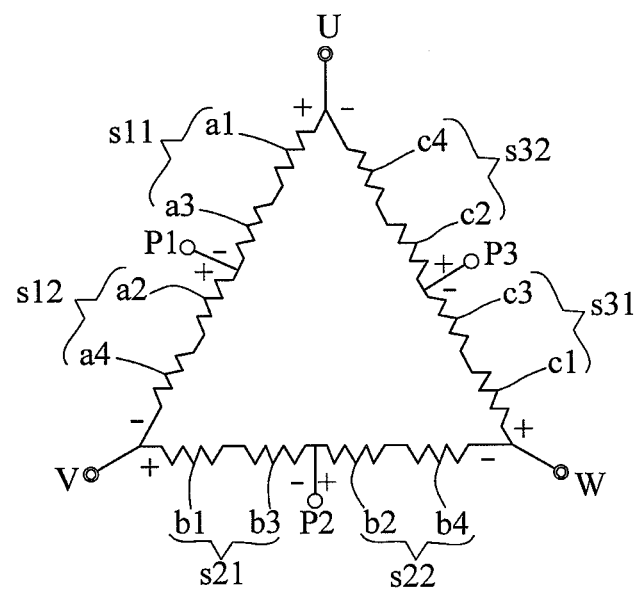
Figure 6D:
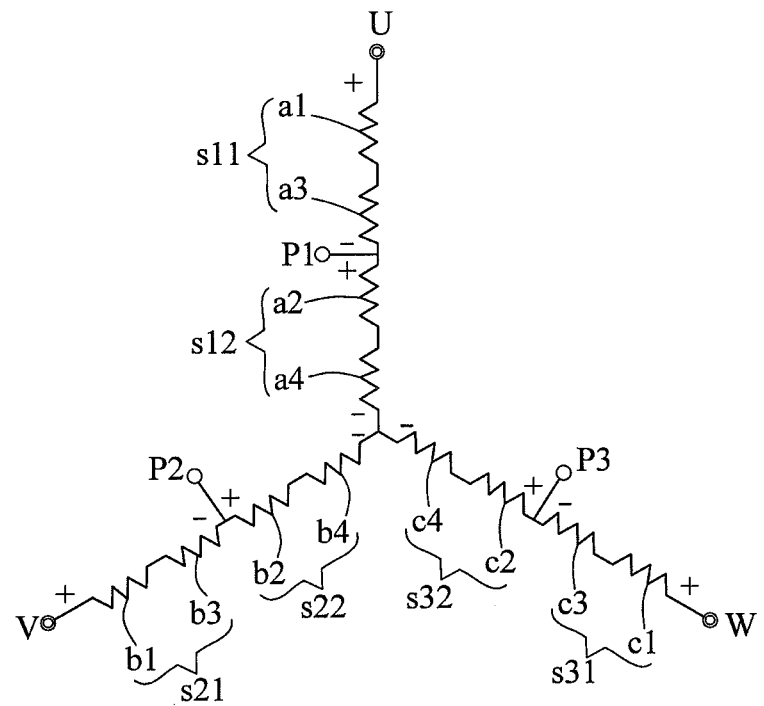

Otherwise, as shown in FIG. 6C, it also can form a coil s11 by winding the first coils a1 and a3 having the same phase in series, and a coil s12 by winding the second coils a2 and a4 having the same phase in series. Then, the coils s11 and s12 are connected to a terminal P1. A coil s21 is formed by winding the first coils b1 and b3 in series, and a coil s22 is formed by winding the first coils b2 and b4 in series. Then, the coils s21 and s22 are connected to a terminal P2. A coil s31 is formed by winding the first coils c1 and c3 in series, and a coil s32 is formed by winding the first coils c2 and c4 in series. Then, the coils s31 and s32 are connected to a terminal P3. Continuously, as shown in FIG. 6C, the coils s11, s12, s21, s22, s31 and s32 are connected as the delta connection (Δ), respectively, and further electrically connected to the power sources with different phases including U, V and W phases. Alternatively, as shown in FIG. 6D, the coils s11, s12, s21, s22, s31 and s32 are connected as the star connection (Y), and further electrically connected to the power sources with different sources including U, V and W phases.

However, the winding orders of the first coils of the first coil assembly 231 and the second coils of the second coil assembly 232 is not limited to the aforementioned winding order shown in FIGS. 6A to 6D, and can be any winding order accompanying the configuration that the first coil assembly 231 and the second coil assembly 232 are formed by the four-group winding method or the two-group winding method and their coils are connected as the delta connection (Δ) or the star connection (Y).

Moreover, as shown in FIG. 2, the three-phase motor 2 in accordance with the preferred embodiment of the present invention can further include a circuit board 24 electrically connected to the first coil assembly 231 and the second coil assembly 232, respectively.

Therefore, when the motor 2 is conducted, the first coil assembly 231 and the second coil assembly 232 can individually have the effective coils able to generate the electromagnetic effects with the magnetic ring 223 of the rotor structure 22 because the motor 2 includes the first coil assembly 231 and the second coil assembly 232 overlapped on the first coil assembly 231 and the first coils of the first coil assembly 231 and the second coils of the second coil assembly 232 having the same phase are disposed relative to each other with the included angle. Thus, the increased amount of the effective coils is beneficial to generate more effective electromagnetic effects with the magnetic body 223 of the stator structure 22. It represents the magnetic flux linkage in the same space can be increased by overlapping the second coil assembly 232 on the first coil assembly 231 with the included angle $\theta_m$. Accordingly, the three-phase motor 2 of the present invention has a higher ratio of the effective coils in comparison with conventional three-phase motors such that it can operate more efficiently.

Figure 7:
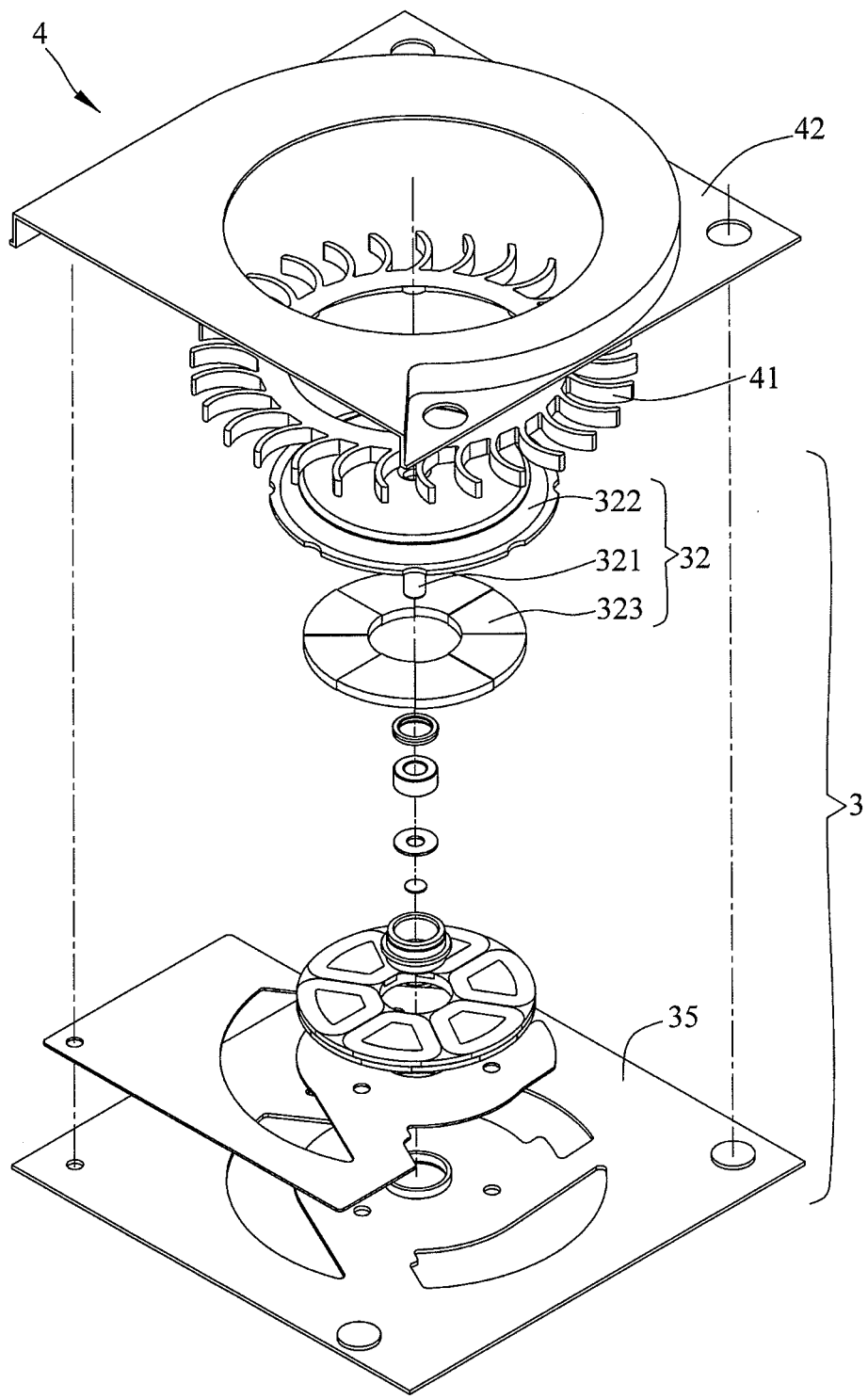
FIG. 7 is a schematic exploded view of a fan in accordance with the preferred embodiment of the present invention.

FIG. 7 is an exploded view of a fan 4 in accordance with the preferred embodiment of the present invention.

As shown in FIG. 7, the fan 4 includes a three-phase motor 3, an impeller structure 41 and an upper cover 42. The impeller structure 41 is connected to the rotor structure 32 of the three-phase motor 3. The upper cover 42 is connected to the three-phase motor 3 and covers the impeller structure 41. In the present embodiment, the impeller structure 41 is connected to the magnetic housing 322 of the rotor structure 3a2, and the upper cover 42 is connected to the base 35 of the three-phase motor 3 to cover the impeller structure 41. Accordingly, the fan 4 of the present invention is formed by the three-phase motor 3, the impeller structure 41 and the upper cover 42. To be noted, the three-phase motor 3 has entire technology characteristics of the aforementioned three-phase motor 2, and the detailed description thereof will be omitted.

Because the three-phase motor 3 of the present invention has a higher ratio of the effective coils in comparison with the conventional three-phase motors, the fan 4 including the motor 3 can operate more efficiently than the conventional fans.

In summary, the three-phase motor in accordance with the present invention includes the first coil assembly and the second coil assembly overlapped on the first coil assembly in the limited space of the stator structure, and one of the first coils of the first coil assembly and one of the second coils of the second coil assembly having the same phase are disposed relative to each other with an included angle. Thus, the first coil assembly and the second coil assembly can individually have the coils able to generate effective electromagnetic effects with the magnetic body of the stator structure. In other words, the first coil assembly and the second coil assembly of the three-phase motor in accordance with the present invention have a higher ratio of the effective coils in comparison with the conventional three-phase motor. Thus, it can promote the operation efficiency of the three-phase motor, and, simultaneously, promote the operation efficiency of the fan including the three-phase motor in accordance with the present invention as well.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A three-phase motor comprising:
a bearing structure comprising a bushing;
a rotor structure comprising a shaft and a magnetic body, wherein the shaft is disposed in the bushing; and
a stator structure disposed corresponding to the rotor structure and comprising a first coil assembly and a second coil assembly overlapped on the first coil assembly,
wherein the first coil assembly comprises a plurality of first coils and the second coil assembly comprises a plurality of second coils, the magnetic body is disposed corresponding to the stator structure,
wherein one of the first coils of the first coil assembly and one of the second coils of the second coil assembly having the same phase are disposed relative to each other with an included angle,
wherein the included angle and the pole pair number of the magnetic body comply with the equation: $\theta_m = 2 \times 180°/P$, wherein $\theta_m$ is the included angle, and P is the pole pair number of the magnetic body.

2. The three-phase motor of claim 1 further comprising:
a base on which the stator structure is disposed.

3. The three-phase motor of claim 2, wherein the rotor structure further comprises a magnetic housing connected to the shaft, and the magnetic housing, the shaft and the base form a receptacle.

4. The three-phase motor of claim 3, wherein the magnetic housing is connected to the shaft by engagement, mounting or adhesion.

5. The three-phase motor of claim 3, wherein the magnetic body disposed in the receptacle and connected to the magnetic housing, and the magnetic body is a magnetic ring formed by a permanent magnet.

6. The three-phase motor of claim 1, wherein each of the first coil assembly and the second coil assembly is a three-phase coreless coil assembly.

7. The three-phase motor of claim 1, wherein the first coils with the same phase in the first coil assembly are disposed opposite to each other.

8. The three-phase motor of claim 1, wherein one of the first coils of the first coil assembly and one of the second coils of the second coil assembly having the same phase are disposed vertically opposite to each other.

9. The three-phase motor of claim 1, wherein the included angle is in inverse proportion to the number of magnetic poles of the magnetic body.

10. The three-phase motor of claim 1, wherein the ratio of the sum of the coil numbers of the first coils and the second coils to the number of the magnetic poles of the magnetic body is 3:2.

11. The three-phase motor of claim 1, wherein the first coil assembly is overlapped on the second coil assembly through a plastic element.

12. The three-phase motor of claim 1, wherein each of the first coil assembly and the second coil assembly are formed by adhesion or plastic injection molding.

13. The three-phase motor of claim 1, wherein the first coils and the second coils are formed by a four-group winding method or a two-group winding method, and the first coils and the second coils are connected as a delta ($\Delta$) connection or a star connection (Y).

14. The three-phase motor of claim 1 being a three-phase coreless motor and further comprising a circuit board electrically connected to the first coil assembly and the second assembly, respectively.

15. A fan comprising:
a three-phase motor comprising:
a bearing structure comprising a bushing,
a rotor structure comprising a shaft and a magnetic body, wherein the shaft is disposed in the bushing, and
a stator structure disposed corresponding to the rotor structure and comprising a first coil assembly and a second coil assembly overlapped on the first coil assembly, wherein the magnetic body is disposed corresponding to the stator structure;
an impeller structure connected to the rotor structure of the three-phase motor; and
an upper cover connected to the three-phase motor and covering the impeller structure,
wherein the first coil assembly comprises a plurality of first coils and the second coil assembly comprises a plurality of second coils,
wherein one of the first coils of the first coil assembly and one of the second coils of the second coil assembly having the same phase are disposed relative to each other with an included angle,
wherein the included angle and the pole pair number of the magnetic body comply with the equation: $\theta_m = 2 \times 180°/P$, wherein $\theta_m$ is the included angle, and P is the pole pair number of the magnetic body.

16. The fan of claim 15, wherein the three-phase motor further comprises a base, and the stator structure is disposed on the base.

17. The fan of claim 16, wherein the rotor structure further comprises a magnetic housing connected to the shaft, and the magnetic housing, the shaft and the base form a receptacle.

* * * * *